United States Patent

[11] 3,586,992

[72] Inventor Allen E. Garfein
Woodland Hills, Calif.
[21] Appl. No. 865,055
[22] Filed Oct. 9, 1969
[45] Patented June 22, 1971
[73] Assignee Engineered Data Peripherals Corporation
Santa Monica, Calif.

[54] CLOCK GENERATOR WITH FREQUENCY CONTROL LOOP CONTAINING AN OSCILLATORY LIMITER
12 Claims, 4 Drawing Figs.

[52] U.S. Cl. .......... 331/17, 331/18, 331/25
[51] Int. Cl. .......... H03b 3/06
[50] Field of Search .......... 331/1 A, 10, 17, 18, 25

[56] References Cited
UNITED STATES PATENTS

| | | | |
|---|---|---|---|
| 2,676,262 | 4/1954 | Hugenholtz | 331/17 X |
| 3,337,813 | 8/1967 | Graeve | 331/17 |
| 3,421,105 | 1/1969 | Taylor | 331/17 X |

*Primary Examiner*—John Kominski
*Assistant Examiner*—Siegfried H. Grimm
*Attorney*—Smyth, Roston & Pavitt

ABSTRACT: A clock generator which produces a stabilized clock output signal and which is used with a storage system including a storage medium and wherein the storage medium includes a reference track to produce a reference signal which is coupled as an input to the clock generator. The clock generator includes a variable voltage-controlled oscillator and incorporates a feedback path to control the output from the clock generator. The feedback path includes an active limiter so as to provide for a very fast response in the feedback path without producing unwanted modes in the output signal from the clock generator. The active limiter includes a pair of voltage sensors for sensing excessive plus or minus excursions of the feedback signal relative to the reference potential and wherein the voltage sensors control an electronic switch to short out the feedback path when the excursion of the feedback signal is above a particular level in a plus or minus direction relative to the reference potential. The electronic switch operates in an oscillatory manner until the level of the feedback signals falls within the permissible range of excursion.

INVENTOR:
ALLEN E. GARFEIN

By Smyth, Roston & Pavitt
ATTORNEYS

INVENTOR:
ALLEN E. GARFEIN
By Smyth, Roston & Pavitt
ATTORNEYS

CLOCK GENERATOR WITH FREQUENCY CONTROL LOOP CONTAINING AN OSCILLATORY LIMITER

The present invention is directed to a clock generator for use with a storage system and specifically for use with a storage system wherein a reference signal is derived from a reference track on a storage medium included in a storage system. The reference signal is used as a sync signal for the clock generator. The clock generator produces an output clock signal, which clock signal is used to control the read-write electronics of the storage system. For example, the storage system may be a magnetic disc memory system wherein a reference signal is recorded on track on the magnetic disc. The clock generator of the present invention may also be used in other storage systems such as a magnetic tape system wherein a reference signal is recorded on the magnetic tape.

Applicant's invention is directed to an improved clock generator using a feedback path from the output of the clock generator to the input of the clock generator, which feedback path includes an active limiter so as to control the level of the feedback signal to prevent the clock generator from going into unwanted modes and to provide for a fast recovery following the loss of synchronization. A problem with prior art clock generators is that large excursions of the feedback signal drive the clock generator into unwanted modes and thereby produce undesired clock pulses. These undesired clock pulses can provide for inaccuracies in the signals developed in the read and write electronics of the storage system. It is therefore very important to prevent these undesired clock pulses which may be produced when the clock generator goes into an unwanted mode.

One solution to the production of these unwanted signals would be to incorporate a limiter in the feedback path in the clock generator. However, the ordinary limiters which have been used in the past incorporate structure such as diodes to provide for a clamping. This type of clamping characteristic does not provide the type of limiting action which would be necessary to completely eliminate or significantly reduce the unwanted modes of operation. Also, the prior art limiters have slowed up the time of response to the feedback signal by reducing the gain of the feedback path.

The present invention is therefore directed to an improved clock generator including an active limiter in the feedback path, which limiter includes a switching characteristic so that the feedback signal is switches rapidly towards a reference potential such as ground when the feedback signal has exceeded a predetermined level in either the plus or minus direction in reference to the reference potential such as ground. The switching characteristic of the limiter may be produced using a pair of voltage sensors which sense positive and negative excursions of the feedback signal relative to the reference potential. These voltage sensors control an electronic switch so as to short out the feedback path when the excursions in the feedback signal are above a predetermined level. In addition, the switching occurs rapidly so as to continuously test whether the excursions of the feedback signal have been corrected. This rapid switching produces a feedback signal which has a desired characteristic to control the clock generator and not drive the clock generator into unwanted modes of operation.

A clearer understanding of the invention will be had with reference to the following description and drawings wherein.

Figure 1:
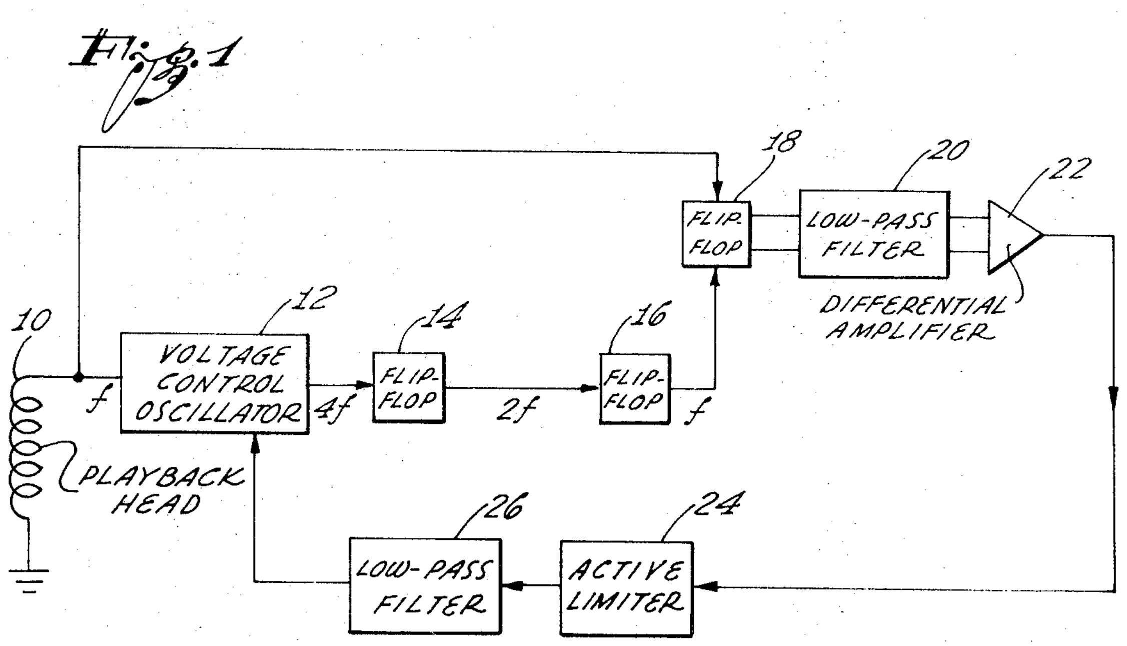
FIG. 1 illustrates a block diagram of a clock generator constructed in accordance with the teachings of the present invention.

In FIG. 1, a playback head 10 is coupled to a storage medium such as a magnetic disc and picks up a reference signal which is applied to a voltage-controlled oscillator 12. The frequency of the signal recorded on the storage medium such as the magnetic disc has a frequency as identified by the small reference character $f$. The voltage-controlled oscillator 12 may be a multivibrator and the reference signal acts as the sync signal for the voltage-controlled oscillator 12.

The output from the voltage-controlled oscillator 12 may have a frequency four times that of the reference signal applied to the voltage-controlled oscillator 12. This is shown by the designation of the signal from the output of the voltage-controlled oscillator as $4f$. The $4f$ signal may be used in the read-write electronics at the appropriate place. The output signal from the voltage-controlled oscillator 12 is applied to a first flip-flop 14 which acts as a frequency divider to produce an output signal having a frequency of $2f$ and the output from the flip-flop 14 is coupled to a second flip-flop 16 which acts as a frequency divider and produces an output signal from the second flip-flop 16 having a frequency of $f$, which frequency is approximately the same as the initial sync frequency applied to the voltage-controlled oscillator 12. The output signals from the flip-flops 14 and 16 may also be used at the appropriate places in the read-write electronics of the storage system.

The output from the flip-flop 16 may be coupled to a first input such as the reset input of a flip-flop 18. The original reference signal input to the voltage-controlled oscillator 12 is also applied as a second input such as the set input of the flip-flop 18. Because of the phase reversals within the voltage-controlled oscillator 12 and the flip-flops 14 and 16, the input to the reset input of the flip-flop 18 may be chosen to be approximately 180° out of phase with the input to the set input of the flip-flop 18. The output from the flip-flop 18, therefore, is switched back and forth in accordance with the signals applied to the set and reset inputs and as long as the set and reset input signals occur exactly 180° with reference to each other, the average value of the differential output from the flip-flop 18 is zero.

However, if the input signals to the set and reset inputs of the flip-flop 18 are not exactly 180° out of phase, the output from the flip-flop 18 does not have an average value of zero, and this output from the flip-flop 18 is coupled through a low-pass filter 20 to produce an error signal having a d-c level in accordance with the phase relationship or frequency relationship of the inputs to the set and reset inputs of the flip-flop 18. This error signal produced by the low-pass filter 20 is amplified by a differential amplifier 22 and is applied to an active limiter 24.

The active limiter 24, in a manner to be explained later, limits the feedback signal so that the voltage-controlled oscillator 12 is not driven into unwanted modes, but the active limiter does not reduce the gain of the feedback path nor does the active limiter have the undesirable characteristics of a clamping circuit. The output from the active limiter 24 actually includes a switching characteristic portion and the switching characteristic portion is passed through a low-pass filter 26 to produce an average error signal which signal is applied to the voltage-controlled oscillator 12 to control the voltage-controlled oscillator in accordance with the error signal to provide for the desired frequency output.

The system of FIG. 1, therefore, is a clock generator which produces clock output signals of four times $f$, two times $f$, or $f$, which signals may be used as control signals in other portions of the read-write circuitry of the storage system. The initial sync reference signal, which is applied to the voltage-controlled oscillator 12, is compared with the output signal from the clock generator using the flip-flop 18, and a feedback path is developed incorporating an active limiter 24 so as to control the operation of the voltage-controlled oscillator.

Figure 2:
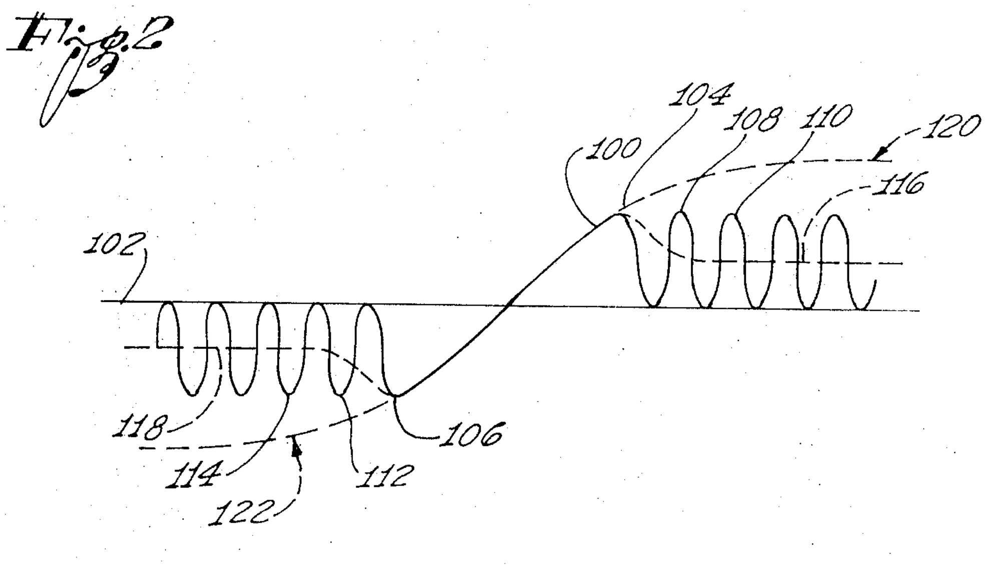
FIG. 2 is a series of curves useful in explaining the characteristics of the invention.

FIG. 2 illustrates a series of curves which help explain the operation of the present invention as opposed to prior art limiters which have undesired characteristics. In FIG. 2, the solid line 100 illustrates the characteristics of the feedback path. As can be seen in FIG. 2, the feedback path has an excursion above and below a common line 102 or ground potential and this voltage excursion above and below the ground potential 102 is used to control the voltage-controlled oscillator 12. It can be seen that the control signal has a rather steep slope so as to provide for a rapid control of the voltage-controlled oscillator 12 shown in FIG. 1. If, however, the voltage excursion of the feedback characteristic 100 exceeds predetermined levels, for example, the levels identified by the point 104 in the positive direction and point 106 in the negative direction, the feedback path, and specifically the active limiter, is controlled to go into a switching characteristic so as to switch the feedback signal toward the common line 102 or ground potential. Periodically the limiter system samples the feedback signal to see whether the excursion in the feedback path is still too great and, if it is, the feedback signal is again switched back towards ground potential. This can be seen by the plurality of switching of points 108, 110, etc., in the positive direction and 112, 114, etc., in the negative direction. As long as the excursion in the feedback path, which represents an improper signal from the clock generator, is above or below these predetermined levels 104 and 106, the feedback path and specifically the active limiter is constructed to enter into an oscillatory mode where the feedback signal is switching back and forth.

The output signal from the active limiter 24, shown in FIG. 1, is passed through the low-pass filter 26 so that the actual signal applied to the voltage-controlled oscillator 12 when the feedback signal exceeds the points 104 and 106 is as shown by the dotted line 116 in the positive direction and 118 in the negative direction. These signals 116 and 118, and specifically the levels of these signals, establish the boundaries of the feedback control once the excursions in the feedback are above the levels 104 and 106.

When the excursions in the feedback path fall below the levels 104 and 106, the signals in the feedback path fall back to the sloping portion 100. This type of characteristic as shown in FIG. 2 allows for a rapid control the voltage-controlled oscillator 12 of FIG. 1 in the area of the normal excursions of the feedback signal but when the excursions exceed predetermined levels in the positive or negative direction, the feedback signal goes into a different characteristic so as not to overdrive the voltage-controlled oscillator 12 and produce unwanted modes of operation. Prior art limiters used diode clamps which have the clamping characteristics as shown by the dash lines 120 and 122. This type of characteristic is unsatisfactory for use with a precision clock generator.

Figure 3:
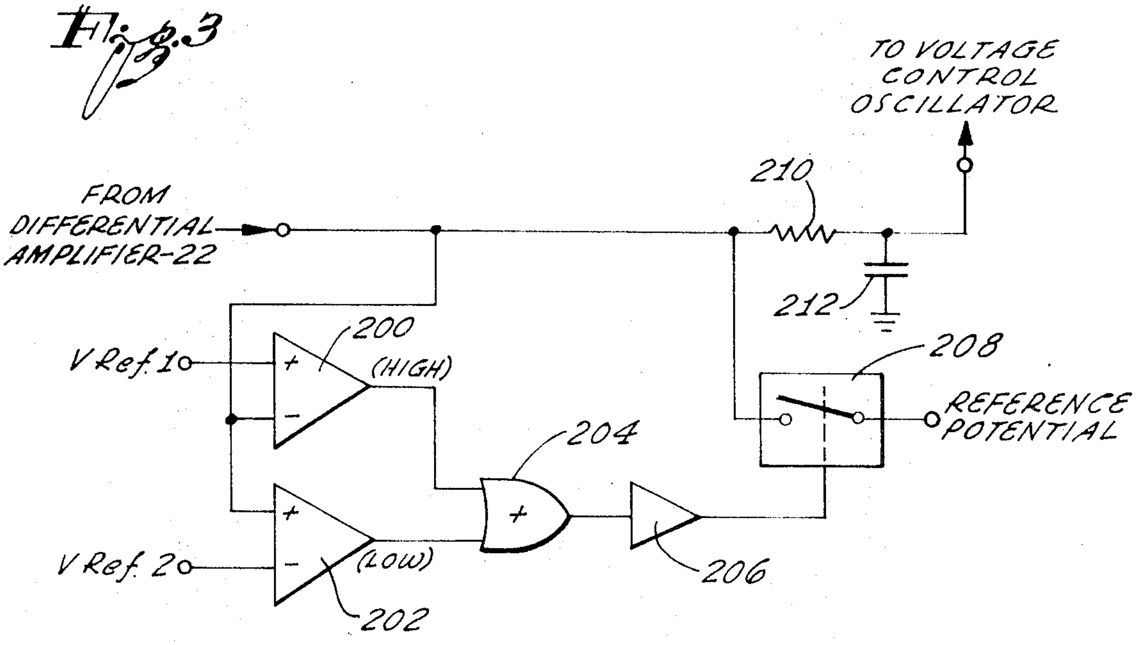
FIG. 3 is a diagram partly in block and partly in schematic form of the active limiter structure of the present invention.

FIG. 3 illustrates in block diagram form the construction of the active limiter of the present invention. As shown in FIG. 3, the feedback signal from the differential amplifier 22 is passed and is monitored by the active limiter which includes a positive voltage sensor 200 such as a differential comparator, a negative voltage sensor 202 such as a differential comparator, an OR gate 204, an amplifier 206 used as a switch driver and an electronic switch 208. The feedback signal is also passed by a low-pass filter including a resistor 210 and a capacitor 212 which averages the signal. The voltage sensors 200 and 202 also include voltage references as inputs. If the excursions of the feedback signal are within the range as shown in FIG. 2 between the points 104 and 106, the low-pass filter merely passes the signal on to control the voltage-controlled oscillator 12. If, however, the voltage excursion on the feedback path exceeds the levels shown by the values 104 and 106 in FIG. 2, either the positive voltage sensor 200 or the negative voltage sensor 202 detects this excursion to produce an output signal.

The outputs from the positive and negative voltage sensors 200 and 202 are coupled to an OR gate 204 which passes a signal when either the positive or the negative voltage sensor is activated. The output from the OR gate is amplified by the amplifier 206 to control the electronic switch 208. Therefore, when the signal on the feedback path exceeds either the positive or negative values shown in FIG. 2 as represented by the levels 104 and 106, which are the voltage references applied to the sensors, either the positive or negative voltage sensor 200 or 202 ultimately controls the switch 208 to be closed. It is to be appreciated that the output from the OR gate 204 or from the voltage sensors 200 and 202 may be used to initiate an out of lock alarm so as to inhibit the recording or playback of data with invalid timing.

When the switch 208 is closed, the feedback signal is switched to a reference potential such as ground. This, of course, lowers the value of the feedback signal so that the positive or negative voltage sensors 200 or 202 are deactivated since the feedback signal falls below the particular level. The switch 208, therefore, is controlled to be open since no signal is applied to the switch from the positive and negative voltage sensors 200 and 202. However, one of the sensors 200 and 202 will be reactivated if the voltage level on the feedback line is still above the predetermined level. The active limiter shown in FIG. 3 therefore provides for a switching from relatively loose tolerances when the clock is in synch to relatively tighter tolerances when the clock is out of synch so as to provide for improved tracking in the storage system.

As shown in FIG. 2, the action of the circuit shown in FIG. 3 produces an oscillating signal. The signal on the feedback line, therefore, is switched back and forth either above or below the ground level in the manner shown in FIG. 2, and the low-pass filter including the resistor 210 and the capacitor 212 provides for an average value of this oscillating signal which average value signal is passed to the voltage-controlled oscillator 12.

Figure 4:
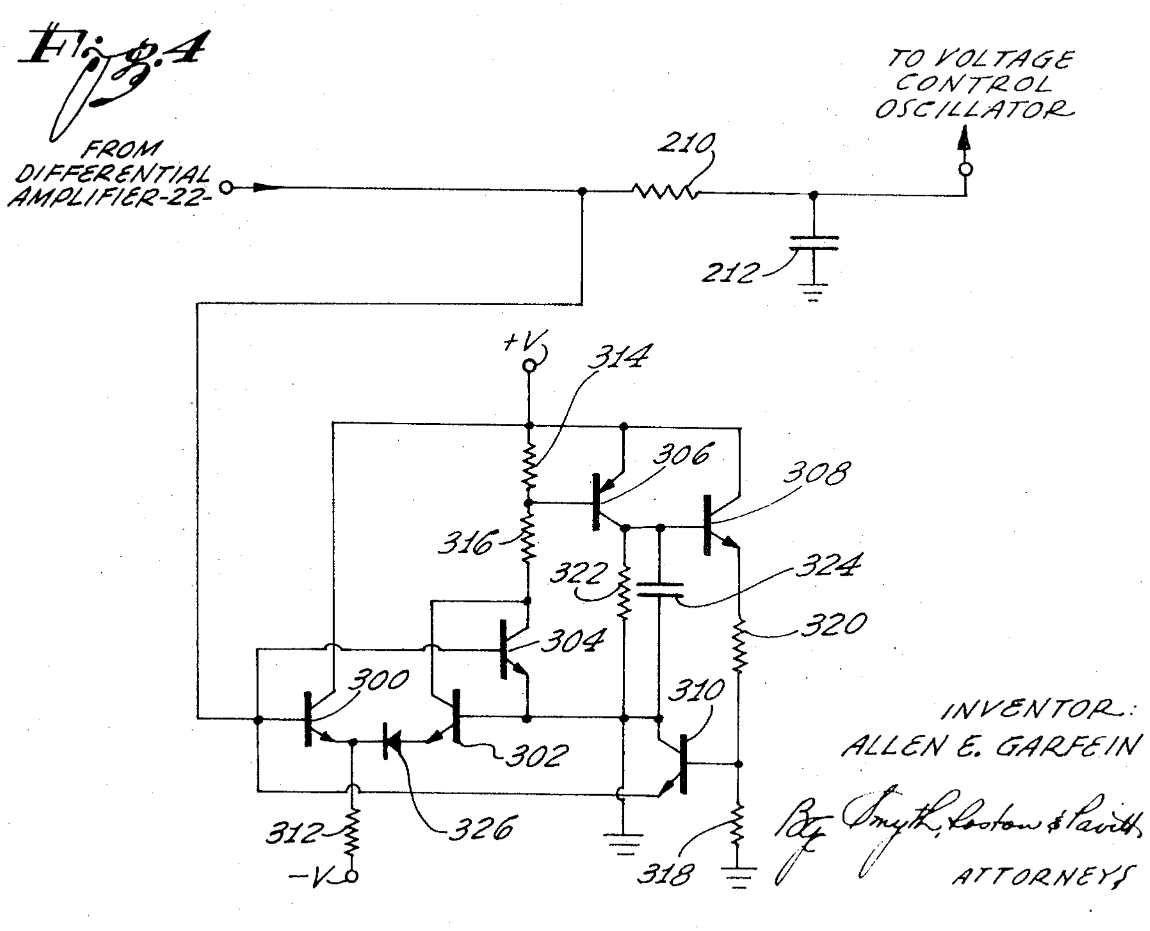
FIG. 4 is a schematic of a particular circuit which may be used as the active limiter of the present invention.

FIG. 4 illustrates in more detail a schematic of a circuit which may be used to provide for the active limiter disclosed in block form in FIG. 3. In FIG. 4, the feedback path is from the differential amplifier 22 and it passes through the low-pass filter, including the resistor 210 and capacitor 212, to the voltage-controlled oscillator 12. The active limiter includes a plurality of transistors 300, 302, 304, 306, 308 and 310. Various resistors are provided to provide for the proper biasing of these transistors and these resistors include resistor 312, 314, 316, 318 and 320. As can be seen in FIG. 4, resistors 312 and 318 are coupled to sources of negative potential whereas resistor 314 is coupled to a source of positive potential. The resistor 322 and capacitor 324 serve as coupling between various ones of the transistors. In addition, the diode 326 is used between the transistors 300 and 302 to provide for a proper flow of current. Finally, it is to be noted that the collector of transistor 310 is coupled to ground and is used to short out the feedback path in a manner to be described.

When the feedback path has a positive excursion greater than the value shown by the level 104 in FIG. 2, this positive excursion is coupled to the base of transistor 304 to turn on transistor 304. This provides a flow of current through the resistors 314 and 316 to turn on transistor 306. When transistor 306 is turned on, current flows through resistor 322 which turns on transistor 308. When transistor 308 is turned on, current flows through resistors 320 and 318 to turn on transistor 310 and this in turn shorts out the feedback line through the transistor 310 since the collector of the transistor 310 is coupled to ground.

When the feedback line is shorted out, the voltage on the base of the transistor 304 is lowered to turn transistor 304 off. Transistor 306, 308 and 310 are also turned off and the voltage on the feedback line, therefore, goes back towards its normal level. If the voltage on the feedback line is still too high, then the preceding operation of the circuit is reinstituted. It can be seen, therefore, that the signal on the feedback has an oscillating mode whenever the voltage on the feedback line is higher than the predetermined value.

When the voltage on the feedback line is less than the predetermined value, for example, the value 106 as shown in FIG. 2, then the circuit including the transistors 300 and 302 which form a differential amplifier allows the transistor 302 to conduct. When the transistor 302 conducts, this in turn produces a flow of current through the resistors 314 and 316, which turns on the transistor 306 and transistor 308. The transistor 310 is then controlled to be on, which shorts out the feedback line. When the voltage on the feedback line is switched towards the ground level, the input to the transistor 300 is reduced and ultimately the transistor 310 is turned off. Again, there is an oscillating mode until the voltage on the feedback line is less than the negative excursion shown in FIG. 2.

The system of the present invention, therefore, provides for a more accurate control of a voltage-controlled oscillator which is part of a clock generator. An active limiter is included in the feedback path so that when the feedback voltage exceeds, in either a positive or a negative direction, the desired value, the limiter goes into an oscillatory mode which then lowers the signal applied to the voltage-controlled oscillator. This prevents the oscillator from being driven into an unwanted mode by the feedback signal. The present system also does not use diode clamping characteristics which would not provide for the rapid switching characteristic and would not prevent the voltage-controlled oscillator from being driven into an unwanted mode. The clock generator of the present invention has found application in storage devices such as memory disc systems wherein the systems become increasingly more critical and there is a great need for very accurate precise clock generation.

Although the present invention has been described with reference to a particular embodiment it is to be appreciated that various adaptations and modifications may be made and the invention is only to be limited by the appended claims.

I claim:

1. In a clock generator including a voltage-controlled oscillator and with a first reference signal coupled to the voltage-controlled oscillator, including:

first means responsive to an output signal from the voltage-controlled oscillator and to the reference signal coupled to the voltage-controlled oscillator for comparing the output signal and the reference signal to produce an error signal in accordance with differences in the characteristics of the output signal and the reference signal;

second means responsive to the error signal from the first means for actively limiting the error signal and with the second means operating when the error signal exceeds a predetermined level and with the second means providing an oscillatory switching of the error signal to a reference potential when the error signal exceeds the predetermined level; and third means responsive to the error signal for averaging the error signal when the error signal is in the oscillating mode and for coupling the error signal to the voltage-controlled oscillator to control the voltage-controlled oscillator.

2. In the clock generator of claim 1, wherein the first means includes a flip-flop having set and reset inputs and wherein the output signal from the voltage-controlled oscillator and the reference signal are out of phase with each other and are coupled to the set and reset inputs of the flip-flop and wherein the output signal from the flip-flop is a square wave having characteristics in accordance with the relative frequencies of the inputs to the flip-flop and wherein the first means includes means for averaging the square wave output from the flip-flop.

3. In the clock generator of claim 1 wherein the second means operates when the error signal exceeds a predetermined level in either a positive or negative direction with respect to the reference potential.

4. In the clock generator of claim 1 wherein the second means includes a positive voltage sensor and a negative voltage sensor to sense excursions of the error signal above the predetermined level either in the positive or negative direction relative to the reference potential and wherein the second means includes a switch means controlled by the positive or negative voltage sensors which switch means couples the error signal to the reference potential when either the positive or negative voltage sensor senses an excursion of the error signal above the predetermined level.

5. A clock generator, including:

first means for producing a reference signal;

a voltage-controlled oscillator responsive to the first reference signal and with the voltage-controlled oscillator producing an output signal;

second means responsive to the output signal from the voltage-controlled oscillator and to the reference signal from the first means for comparing the output signal and the reference signal to produce an error signal in accordance with differences in the characteristics of the output signal and the reference signal;

third means responsive to the error signal from the second means for actively limiting the error signal and with the third means operating when the excursions of the error signal exceed a predetermined level and with the third means including means for successively switching of the error signal to a reference potential when the excursions of the error signal exceed the predetermined level; and fourth means responsive to the error signal for coupling the error signal to the voltage-controlled oscillator to control the voltage-controlled oscillator.

6. The clock generator of claim 5, wherein the second means includes a flip-flop having set and reset inputs, and wherein the output signal from the voltage-controlled oscillator and the reference signal from the first means are coupled to the set and reset inputs of the flip-flop and wherein the output signal from the flip-flop is in accordance with the relative frequencies of the inputs to the flip-flop.

7. The clock generator of claim 5, wherein the third means operates when the excursions of the error signal exceed the predetermined level in either the positive or negative direction with respect to either reference potential.

8. The clock generator of claim 5, wherein the third means includes a positive voltage sensor and a negative voltage sensor to sense the excursions of the error signal above the predetermined level either in the positive or negative direction relative to the reference potential and wherein the third means includes a switch means controlled by the positive or negative voltage sensors which switch means couples the error signal to the reference potential when either the positive or negative voltage sensor senses the excursion of the error signal above the predetermined level.

9. In a clock generator including a voltage-controlled oscillator and with a first reference signal coupled to the voltage-controlled oscillator and including means for comparing the output signal from the voltage-controlled oscillator and the reference signal to produce a feedback signal for controlling the voltage-controlled oscillator, a limiter included in the feedback path for limiting excursions of the feedback signal;

first means responsive to the feedback signal from the means for comparing;

second means coupled to the first means for detecting when the feedback signal exceeds a predetermined level;

third means coupled to the second means for providing an oscillatory switching of the feedback signal to a reference potential when the second means detects that the feedback signal has exceeded the predetermined level.

10. In the clock generator of claim 9, additionally including means responsive to the feedback signal for averaging the feedback signal when the feedback signal is in the oscillating mode.

11. In the clock generator of claim 9, wherein the second means detects when the feedback signal exceeds the predetermined level in either a positive or negative direction with respect to the reference potential.

12. In the clock generator of claim 9, wherein the second means includes a positive voltage sensor and a negative voltage sensor to detect excursions of the feedback signal above the predetermined level either in the positive or negative direction relative to the reference potential and wherein the third means is a switch means controlled by the positive or negative voltage sensors which switch means couples the feedback signal to the reference potential when either the positive or negative voltage sensor detects an excursion of the error signal above the predetermined level.